US008322288B2

(12) United States Patent
Misso et al.

(10) Patent No.: US 8,322,288 B2
(45) Date of Patent: Dec. 4, 2012

(54) OPERATOR SYSTEM WITH INDEPENDENT CHAIN DRIVE

(75) Inventors: Mark M. Misso, Middleport, NY (US); Frank D. Darrow, Newfane, NY (US); James Tomasine, Lockport, NY (US)

(73) Assignee: Lynx Product Group, LLC, Wilson, NY (US)

( * ) Notice: Subject to any disclaimer, the term of this patent is extended or adjusted under 35 U.S.C. 154(b) by 846 days.

(21) Appl. No.: 12/482,838

(22) Filed: Jun. 11, 2009

(65) Prior Publication Data

US 2010/0000583 A1 Jan. 7, 2010

Related U.S. Application Data

(60) Provisional application No. 61/131,833, filed on Jun. 12, 2008.

(51) Int. Cl.
*B61B 12/00* (2006.01)

(52) U.S. Cl. .................. 104/172.5; 104/172.1; 134/123

(58) Field of Classification Search ............... 104/172.1, 104/172.3, 172.5; 134/123
See application file for complete search history.

(56) References Cited

U.S. PATENT DOCUMENTS

| RE30,026 | E | * | 6/1979 | Hanna et al. ............... | 104/172.3 |
|---|---|---|---|---|---|
| 4,266,482 | A | * | 5/1981 | Barber ........................ | 104/172.3 |
| 4,790,247 | A | * | 12/1988 | Summa ...................... | 104/172.2 |
| 5,443,014 | A | * | 8/1995 | Belanger et al. ........... | 104/172.3 |

\* cited by examiner

*Primary Examiner* — Michael Barr
*Assistant Examiner* — Jason Ko
(74) *Attorney, Agent, or Firm* — Simpson & Simpson, PLLC

(57) ABSTRACT

The invention presented comprises an operation system in which items to be processed by an operator, such as a washer/dryer, bulk sterilizer, or kiln, are fed into and removed from the operator by a continuous conveyor. A microcontroller controls actuators in loading zones distributed along the conveyor that switch the individual loading zones from bypass to push mode to alternately allow the items to remain stationary on the moving conveyor or be moved to a downstream loading zone when in the push mode. In a preferred embodiment, at least one loading zone is located at least partly within the operator.

18 Claims, 10 Drawing Sheets

OPERATOR SYSTEM WITH INDEPENDENT CHAIN DRIVE

CROSS-REFERENCE TO RELATED APPLICATIONS

This application claims the benefit under 35 U.S.C. §119(e) of U.S. Provisional Application No. 61/131,833 filed on Jun. 12, 2008 which application is incorporated herein by reference in its entirety.

FIELD OF THE INVENTION

The field of the operation is carrier chain drive conveyors, more specifically to chain drives conveyors used to deliver articles for processing to an operator or operating system and remove articles from an operating system, and still more specifically, independently controlled chain drive conveyors.

BACKGROUND OF THE INVENTION

A problem that is prevalent in hospitals, clinics, and similar medical facilities is that of contamination of equipment that can be passed to patients and even employees in those facilities. In order to reduce or eliminate contamination of sensitive areas, not only are medical and surgical instruments sterilized, but also storage cabinets and transports are decontaminated to remove as many pathogens as possible before the sterilized instruments and other equipment are moved into sensitive areas such as operating rooms and intensive care units.

This problem is also found in animal care facilities such as facilities that breed or house medical animals such as monkeys, rats, guinea pigs, etc. Animals are commonly housed in cages stored on carts equipped with rollers, castors, wheels, etc. for easy movement to a desired location. The cages and transports carts ("carts") are a prime source of contamination from animal waste, vectors living on the animals, movement of contaminants through ventilation systems, etc. Such contamination problems are often exacerbated by the large quantity of items that may be contaminated.

To overcome this problem, transports carts for wrapped sterilized instruments and animal cages, as well as the cages themselves, are decontaminated in automatic washer or washer/dryer machines ("washers") using decontamination solutions. These washers are often controlled by a microcontroller using software to regulate, for example, wash, rinse and dry times and delivery of decontaminate solutions. In facilities where it is necessary to decontaminate large numbers of carts, washers can be equipped with chain drive conveyors or other suitable types of conveyors to automatically move carts into and out of the washers under computer control.

One problem in operating these washers is that carts must constantly be fed into and removed from the washer while it is operating. However, wash cycles are slow enough that there is a significant time lapse after a cart is loaded before a wash cycle is finished, the carts move, and room is again available for an additional cart to be placed online by a worker. While some washers are fed using carriers such as carrier chains with chocks to push the carts, they operate in synchronization with the wash/dry cycle so only one cart can be placed on the tow chain at a time. Attempts have been made to operate the chain independently of the wash cycle, but carts, especially the cart wheels, are often damaged by the carriers or pushers on the chains that actually move the cart toward or away from the washer. In addition, usually a worker must be present to constantly feed the carts onto the carrier chain even if he or she must remain idle during a wash cycle.

Therefore, there exists a problem in the field to maintain an efficient, constant supply of carts to washers without relying on the constant presence of personnel to feed carts one at a time at the right time or on a chain feed system that is prone to damaging equipment.

SUMMARY OF THE INVENTION

The present invention broadly comprises an operating system with a chain drive comprising: a microcontroller; an operator having an entrance; a carrier chain conveyor extending at least to the entrance of the operator and driven by the at least one chain drive motor and the chain drive rotator; a plurality of pushers rotatably attached to the chain; a channel having an upper side, the channel containing the carrier chain; a plurality of extendable shelves under the upper side and distributed along the length of the channel; and, a plurality of shelf actuators, each of the plurality of shelf actuators operatively attached to one of the plurality of extendable shelves to move that one of the plurality of shelves into or away from slots located on either side of the channel. The microcontroller is functionally attached to at least the plurality of shelf actuators. The plurality of shelf actuators is divided into a plurality of loading zones with each of the plurality of loading zones having at least one shelf actuator.

In one embodiment, the operator may be a washer and/or dryer. In alternate embodiments, the operator may be a cement kiln or a bulk sterilizer. In another alternate embodiment, the operator further includes an exit. In still another embodiment, the operating system includes at least one blocker for each loading zone.

The present invention also broadly comprises a method of loading one or more items on an operating system having a moving independent chain drive, an operator, and a plurality of loading zones, the method comprising:
1. positioning at least one of the one or more items onto the chain into at least one loading zone;
2. moving a shelf associated with at least one of the at least one loading zones into the push position;
3. retracting a blocker associated with the at least one of the at least one loading zone into the push position;
4. rotating into a push position at least one of a plurality of pushers, each of the plurality of pushers rotatably attached to the moving chain to move the one or more items;
5. moving into the push position a shelf associated with an additional loading zone downstream from the at least one of the at least one loading zone;
6. pushing the one or more items into the additional downstream loading zone;
7. extending a blocker associated with the additional downstream loading zone into a blocking position across the chain drive;
8. lowering the shelf in the downstream loading zone into a bypass position; and,
9. rotating the pusher into the bypass position.

In an alternate embodiment, the method further comprises repeating steps 2-9. In a second alternate embodiment, at least one of the plurality of loading zones is positioned at least partly in the operator. In a third alternate embodiment, at least one of the downstream loading zones is on the exit side of the operator.

One object of the invention is to supply a conveyor system in which wheeled carts can be stopped and started while keeping the conveyor running continuously.

A second object of the invention is to provide a system in which wheeled carts or other carrier devices can be moved by steps without sustaining excessive damage.

A third object is to describe a conveyor system that can supply an operator without continuous human supervision.

An additional object of the invention is to supply a conveyor system for loading and unloading an operator using a single continuous conveyor.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF PREFERRED EMBODIMENTS OF THE INVENTION

At the outset, it should be appreciated that like drawing numbers on different drawing views identify identical structural elements of the invention. It also should be appreciated that figure proportions and angles are not always to scale in order to clearly portray the attributes of the present invention.

While the present invention is described with respect to what is presently considered to be the preferred embodiments, it is understood that the invention is not limited to the disclosed embodiments. The present invention is intended to cover various modifications and equivalent arrangements included within the spirit and scope of the appended claims.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
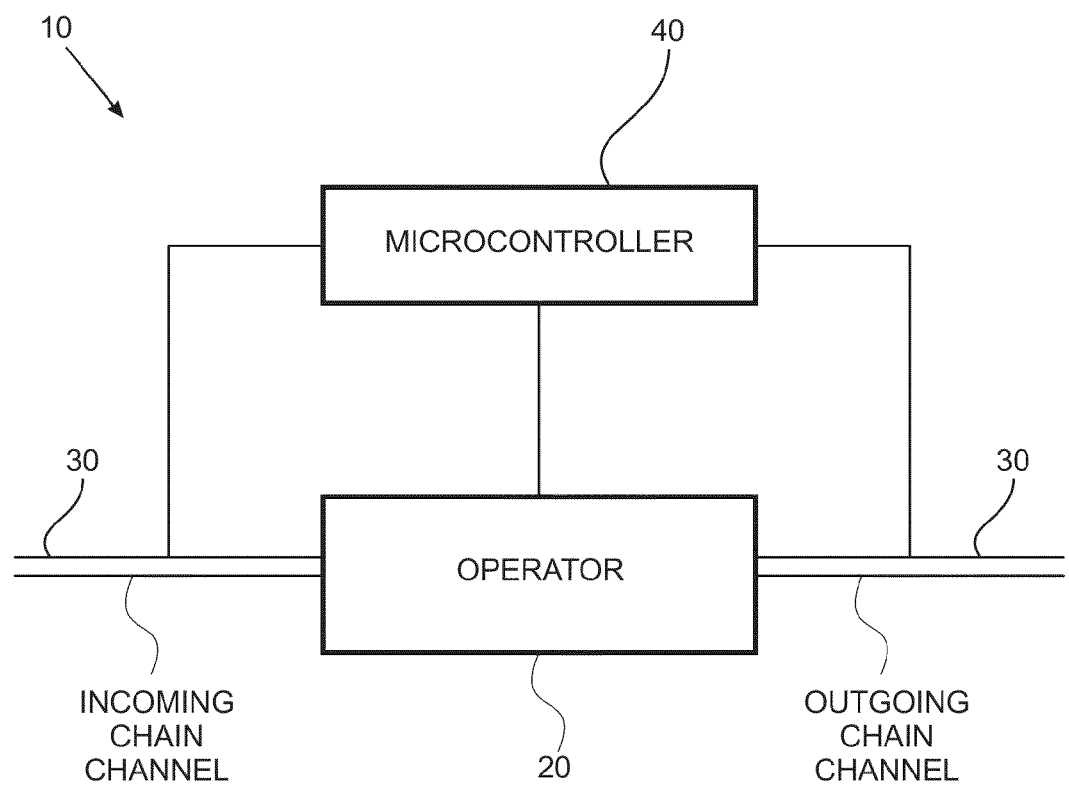
FIG. 1 is a schematic drawing of the operator system of the present invention.

Adverting to the drawings, FIG. 1 is a schematic drawing of operator system 10 ("system 10") of the present invention. Operator 20 may be any type of machine that receives and processes or acts on items, after which the items are discharged from or consumed by operator 20 to receive a new lot or batch of items for processing. Examples of operator 20 include, but are not limited to, washers, bulk sterilizers, and cement kilns. Chain conveyor 30 ("conveyor 30") is a carrier chain conveyor that moves the items into operator 20 and, if necessary, removes them after processing. Preferably, conveyor 30 is a continuous conveyor that encompasses both the input and removal functions of item delivery. Operation of operator 20 and conveyor 30 is controlled by one or more microcontrollers 40. The operation of system 10 described below is preferably controlled by microcontroller 40 that is specifically provided with the necessary software to control the operation described below. In the operational description described below, a washer is used as an example of operator 20. Persons of skill in the art will recognize that other operators 20, such as those listed above, can be used with system 10.

Figure 2:
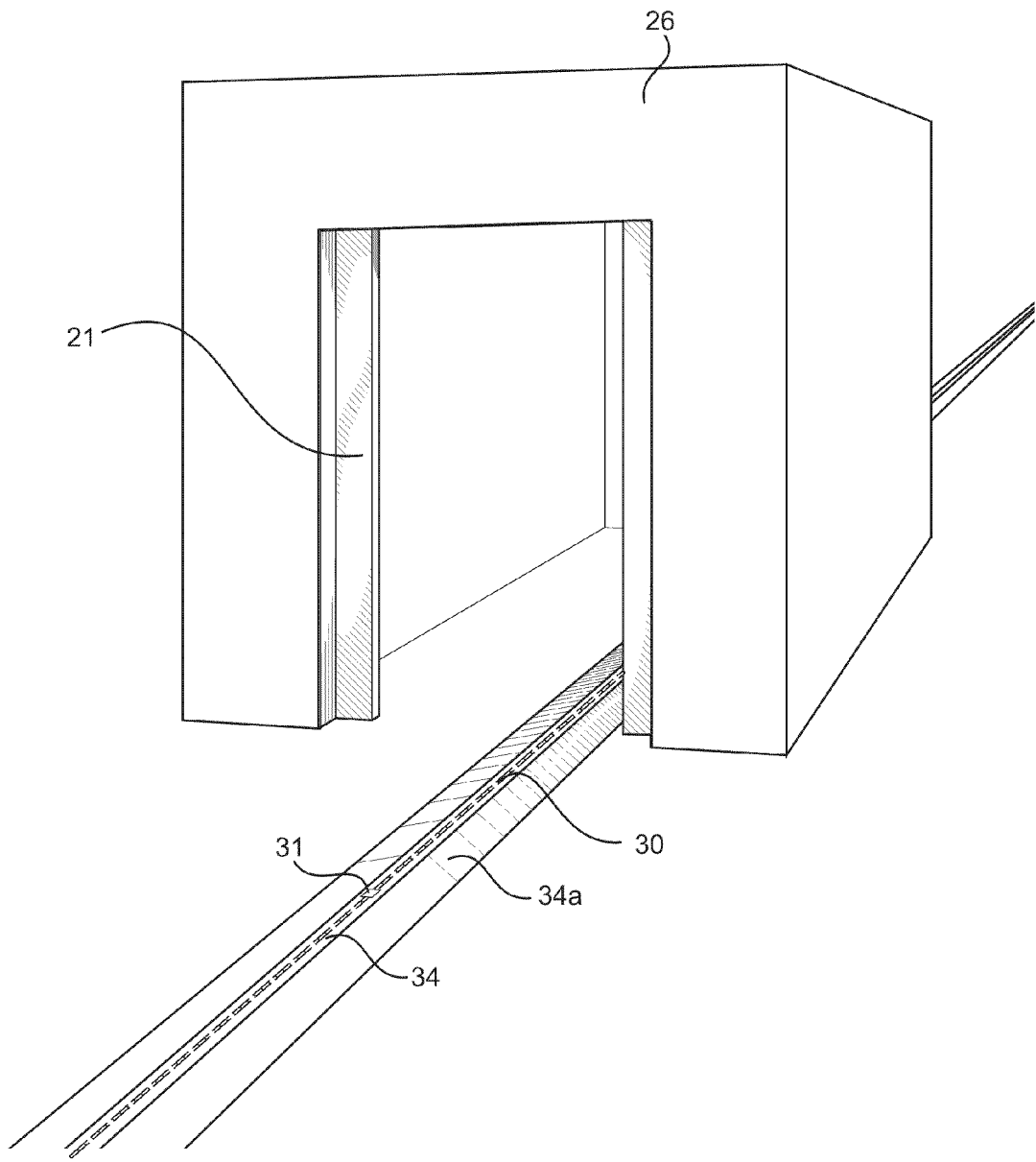
FIG. 2 is a front perspective view of the operator system of the present invention in which the operator, in this case a washer, with the chain conveyor seen passing into the washer.
Figure 3:
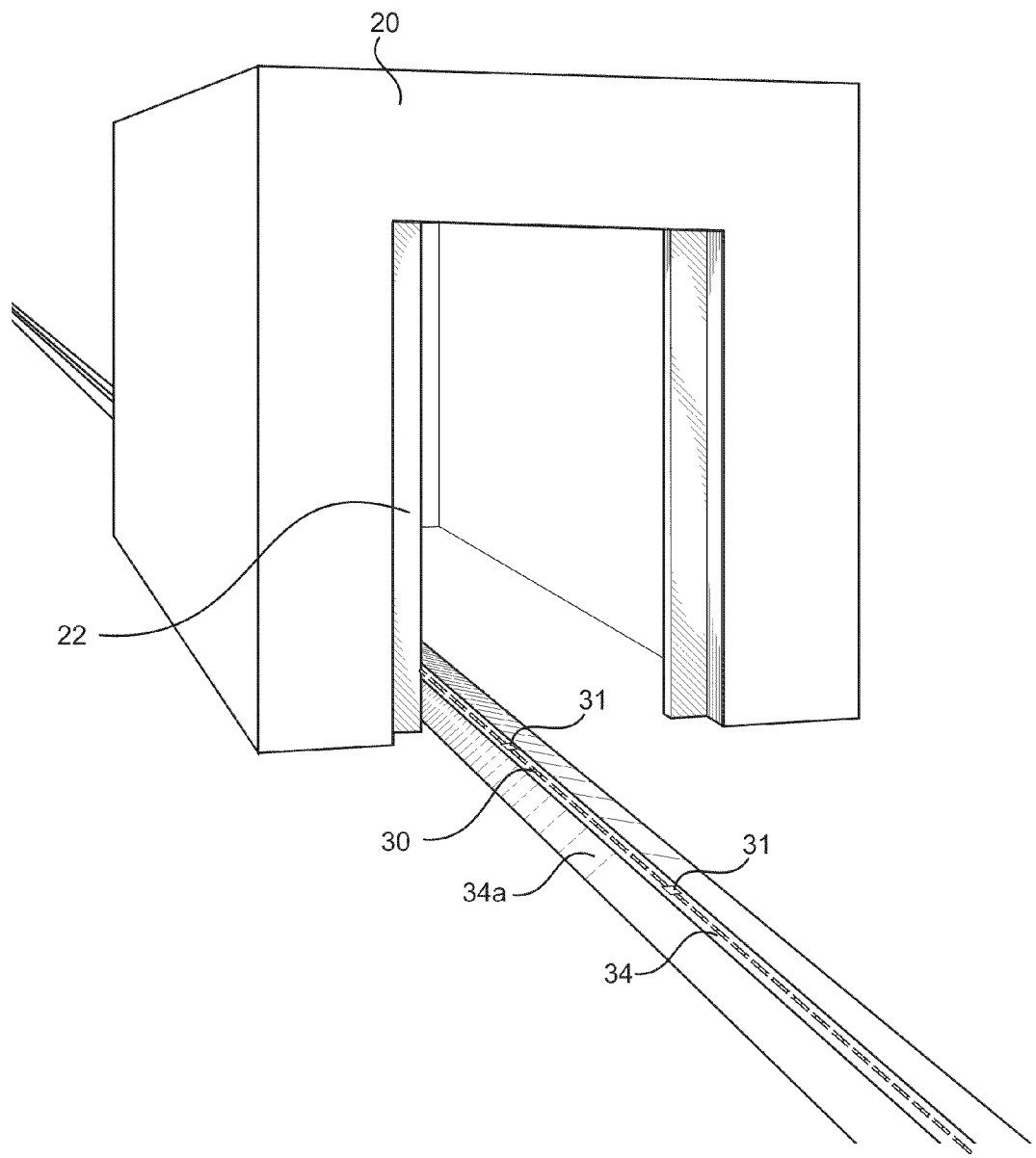
FIG. 3 shows an open exit door of the washer with the carrier chain conveyor passing through the washer.

FIG. 2 is a front perspective view of a system 10 in which washer 20 ("washer 20") is a chamber with an entrance door 21. Chain conveyor 30 is seen passing into washer 20. Washer 20 may also include a dryer function that will dry the items within operator 20 after being washed. Preferably, washer 20 will also include an exit door leading out the opposite side of washer 20 as seen schematically in FIG. 1. FIG. 3 shows open exit door 22 showing chain 30 passing through washer 20. A typical washer 20 are Lynx Models 480 LX and 486 LX manufactured by Lynx Product Group LLC, Wilson, N.Y. Chain systems having a rolling load capacity of 5000 lbs and one horsepower drive motors may be used in typical systems. Persons of skill in the art will recognize if different load and power capacities are need to accommodate different types of loads.

Figure 4:
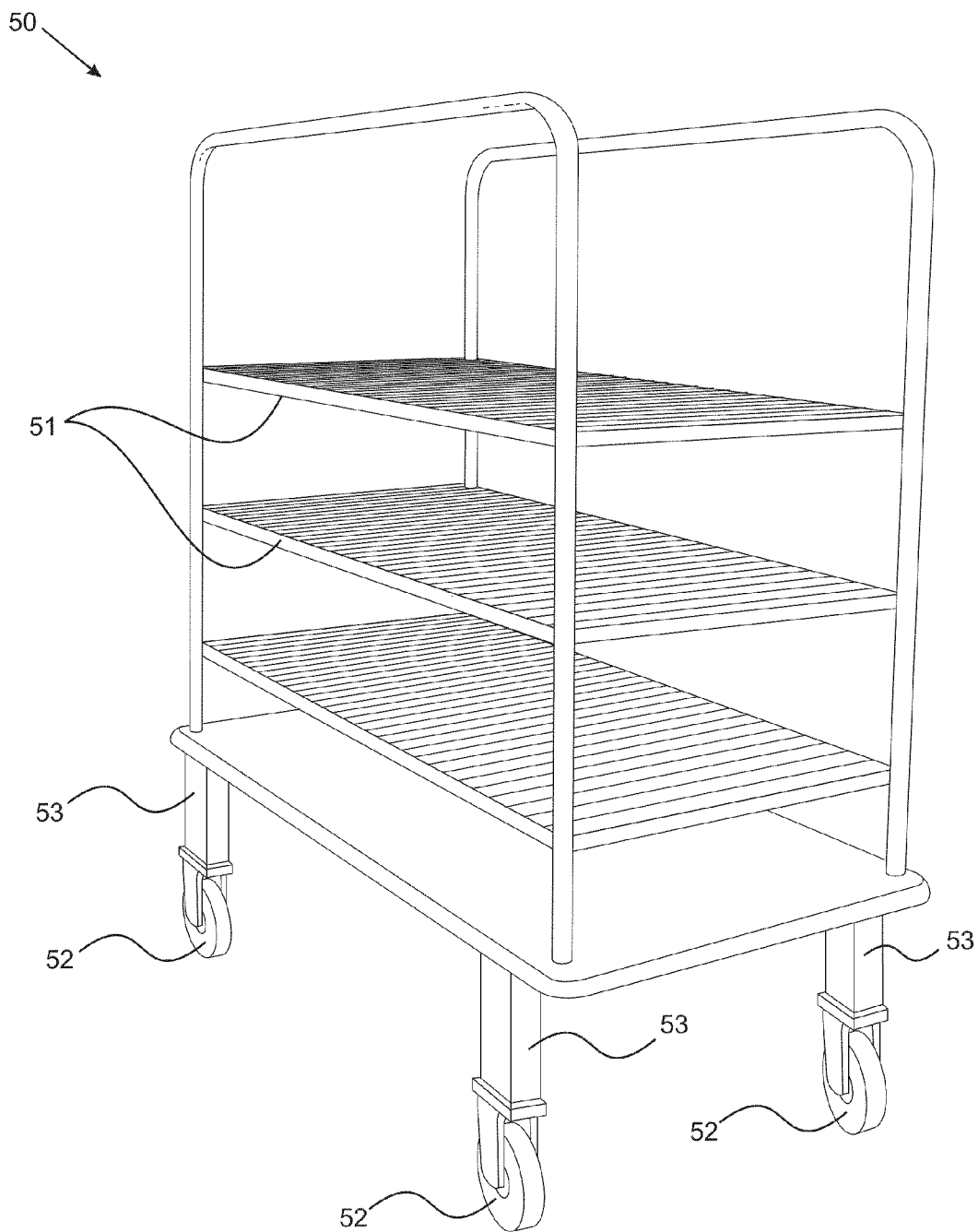
FIG. 4 is an example of a wheeled cart that is moved through the operator system to transport items to be processed to an operator.

FIG. 4 is an example of a wheeled cart ("cart 50") that is moved through system 10 to transport items to be washed to washer 20. Cart 50 includes racks 51 for holding the specific item(s) to be washed. In this embodiment, the racks are open to allow the wash solution to easily reach all of the items. In an alternate embodiment, a single item having wheels, casters, or rollers may be transported by conveyor 30. The term "wheels" also includes rollers, casters, and similar devices that may be used to move a cart or other apparatuses into and along conveyor 30.

Figure 5A:
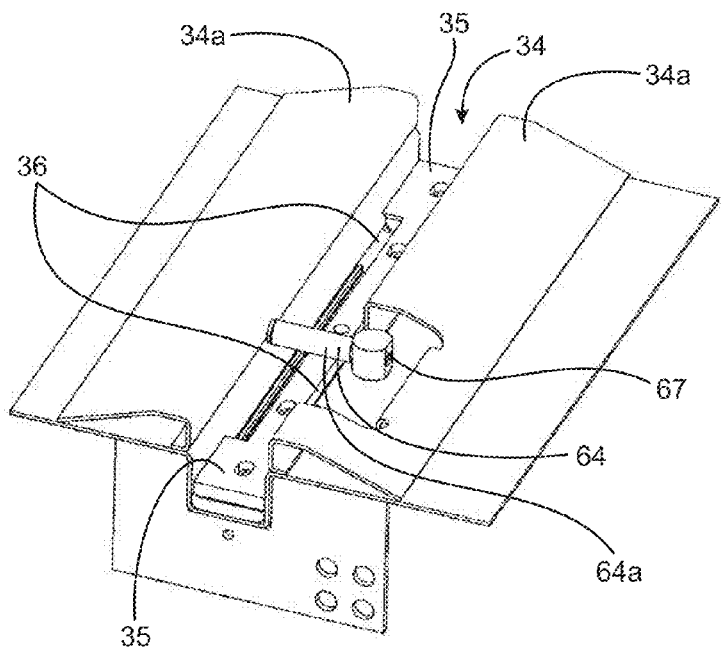
FIG. 5A is a top perspective view of a section of the conveyor channel through which the chain conveyor travels in the bypass mode.
Figure 5B:
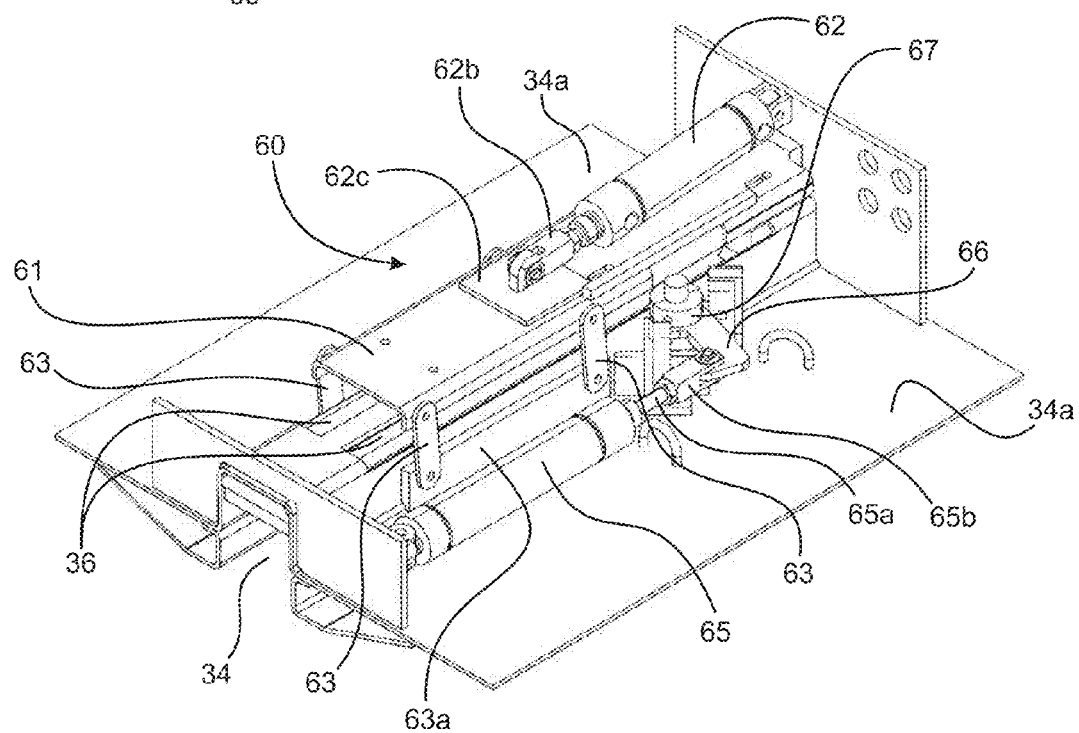
FIG. 5B is a bottom perspective view of a section of the conveyor channel through which the chain conveyor travels in the bypass mode.

FIGS. 5A and 5B are top and bottom perspective views, respectively, of a section of conveyor channel 34 through which chain conveyor 30 (not seen for clarity) travels. Both FIGS. 5A and 5B depict the blocking or bypass mode of system 10 in which blocking means 64, such as rotating blocking bar 64, extends across conveyor channel 34 while at the same time, pusher 31 falls or rotates back against the direction of movement of conveyor 30 to pass under wheel(s) 54 of cart 50. Chain 30 may rest on center strip 35. Preferably, center strip 35 is fabricated from a plastic material such as for example, polyethylene or Teflon, but any suitable material known to those skilled in the art may be used. Channel walls 34a, preferably made of sheet metal, line the sides of channel 34 to protect the channel from damage from carts 50 as they are moved along channel 34 and to keep carts 50 on conveyor 30.

Assembly 60 includes actuators controlled by microcontroller 40 that are operatively attached to components as described below to move those components from the bypass mode to the push mode. By operatively attached is meant that a component or device is connected either directly or indirectly to a second component and causes that second component to move or function. For example, as described below, actuator 62 is operatively attached to shelf 61 to enable shelf 61 to move from bypass to push mode.

Slots 36 are seen to flank each side of center strip 35. In the bypass mode seen in FIG. 5A, slots 36 are empty. The empty slots provide the clearance to allow pusher 31 to rotate down onto chain 30. When rotated down, pusher 31 passes underneath the wheels of cart 50 enabling chain 30 to move under a stationary cart 50. Also in the bypass mode, blocker 64 rotates across channel 34 to prevent carts 50 from moving in channel 34 while chain 30 is moving. In a preferred embodiment, shell 64a loosely encloses most or all of blocker 64 and rotates against wheel 52 in the bypass mode to mitigate possible damage to wheels 52 urged against blocker 64.

In the bottom perspective view of the bypass mode, shelf 61 is seen as a u-shaped channel. Shelf actuator 62 is controlled by microcontroller 40 to pull actuator rod 62a (not seen in FIG. 5A) into actuator 62. This acts to pull shelf 61, attached to rod 62a by plate 62b, so that the sidewalls of shelf 61 are moved away from slots 36 to open them. Swivels 63 are attached to both shelf 61 and stationary bar 63a to act as rotating pivots to move shelf 61 away from slots 36.

In concert with the movement of shelf 61 away from slots 36, microcontroller 40 activates blocker 64 to rotate across channel 34. Blocker actuator 65 pulls in actuator rod 65a which also pulls clasp 65 in. Swivel 66 is rotatably attached to both clasp 65b and pivot 67. The outward movement of clasp 65b moves swivel 66 which rotates pivot 67 thereby rotating blocker 64 across channel 34.

Thus, in the pusher bypass ("bypass") mode, cart 50 is prevented from moving by blocker 64 without damaging chain 30, pusher 31, or wheels 52 of blocked cart 50 by enabling pusher 31 to rotate flat onto chain 30 and pass under the wheels 52 of cart 50 rather than forcing an upright pusher 31 against a blocked obstacle (a cart wheel).

Figure 6A:
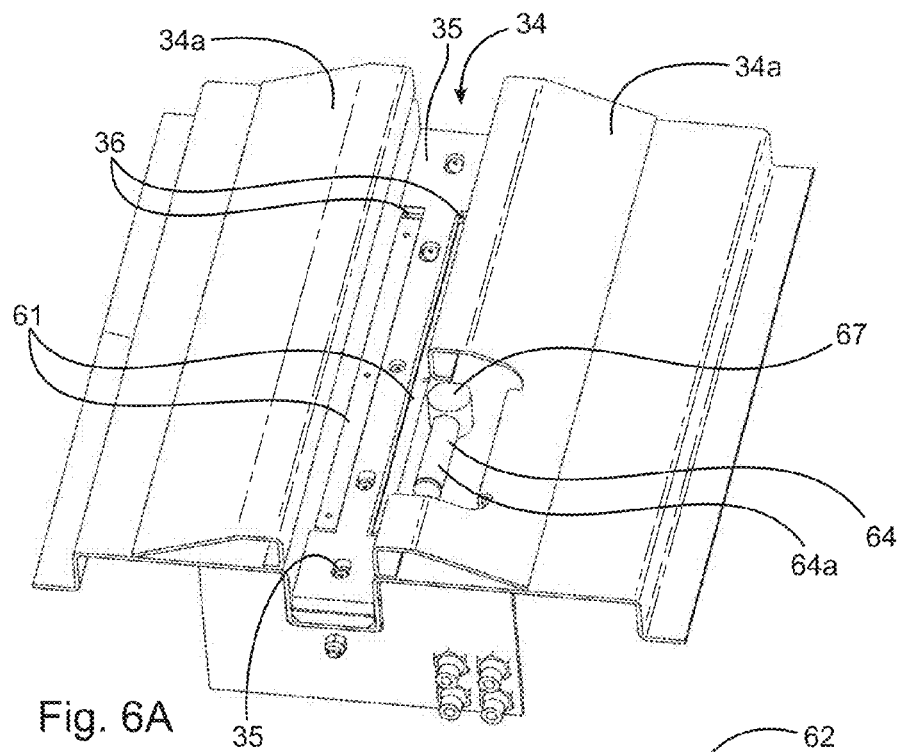
FIG. 6A is a top perspective view of a section of the conveyor channel through which the chain conveyor travels in the push mode.
Figure 6B:
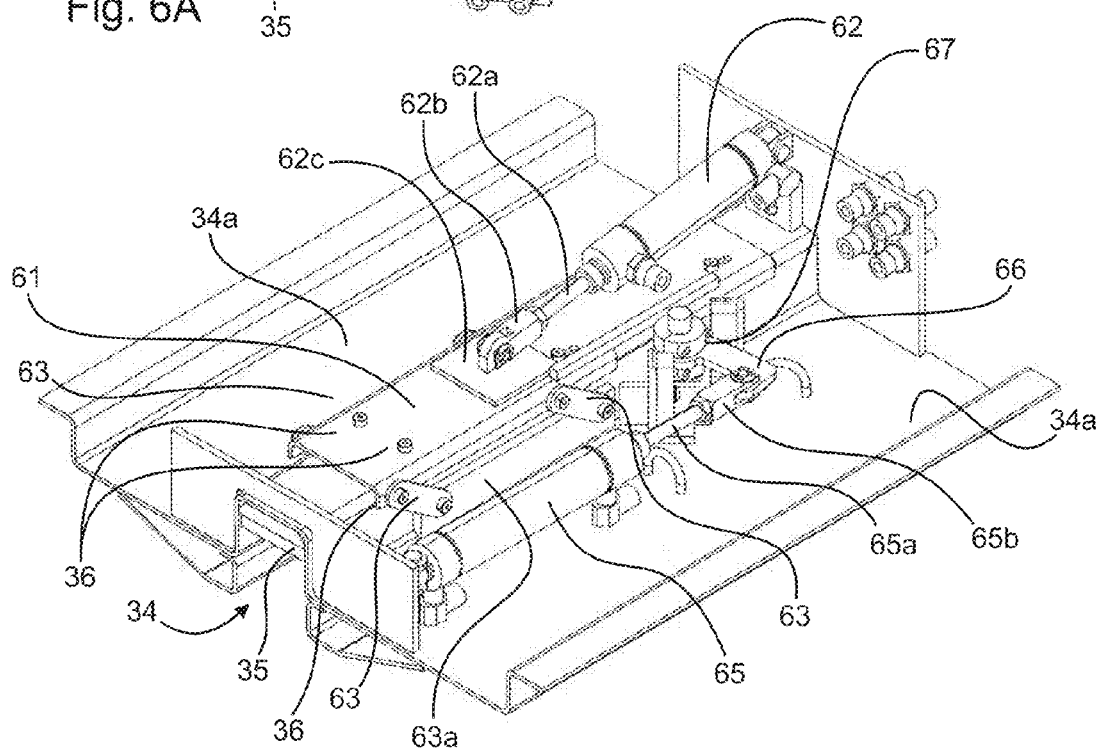
FIG. 6B is a bottom perspective view of a section of the conveyor channel through which the chain conveyor travels in the push mode.

FIGS. 6A and 6B are top and bottom perspective views, respectively, of channel 34 and assembly 60 in push mode during which wheeled carts are pushed along channel 34 by pushers 31 that are attached to chain 30 and rotated up away from chain 30 into the push position. Also in push mode, blocker 64 is rotated away from across channel 34. Again, chain 30 with pusher 31 is removed to more clearly illustrate assembly 60 in the push mode.

In push mode, rod 62a is extended from actuator 62. Attached clasp 62b is attached to plate 62c on shelf 61. The extension pushes swivels 63 and shelf 61 up into slots 36 (not visible in FIG. 6B) at least partly filling those slots. At the same time, microcontroller 40 activates actuator 65 to extend arm 65a pushing swivel 66 to rotate pivot 67 which turns blocker 64 into the retracted position in the opening in channel wall 34a. Persons of skill in the art will recognize that actuators 62 and 65 may operate in reverse to achieve the same bypass and push modes. For example, extension of actuator rod 62a may be used to move shelf 61 into the bypass mode.

In the push mode, with shelf 61 moved up into, or closer to, slots 36, there is insufficient clearance for pushers 31 to remain flat against chain 30. Pushers 31 are rotated up as seen in FIG. 6A and moving chain 30 moves the rotated pushers against a wheel of cart 50 forcing it to move. Because at the same time, or preferably a few seconds before, blocker(s) 64 have been turned out of channel 34, pusher(s) 31 and conveyor 30 are able to push cart(s) 50 through channel 34 toward or away from operator 20.

Figure 7:
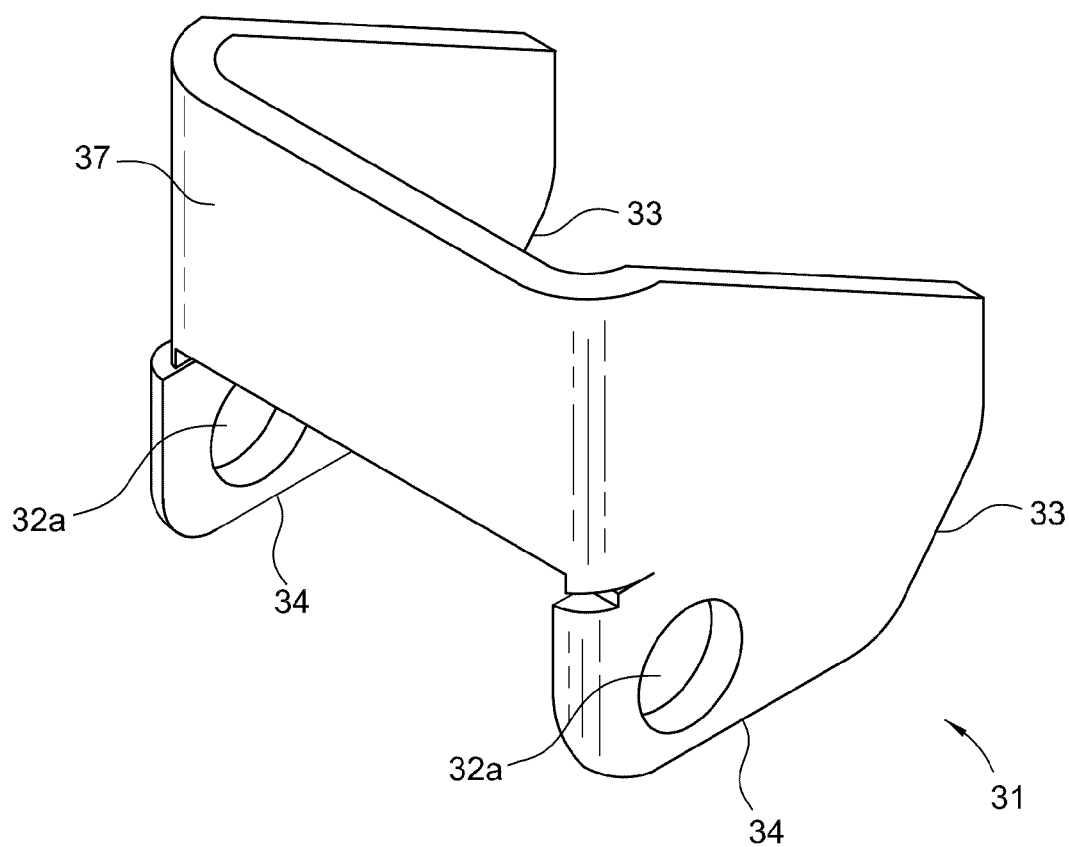
FIG. 7 is a side perspective view of the pusher of the present invention.

FIG. 7 is a side perspective view of pusher 31. Holes 32a are directly opposite each other and receive pivot 32 to rotatably attach pusher 31 to chain conveyor 30. In the bypass mode, pusher 31 lies flat against conveyor 30 with edges 33 and 34 extending below chain 30. Pushing surface 37 ("surface 37") faces up from chain 30 in the bypass mode.

Figure 8A:
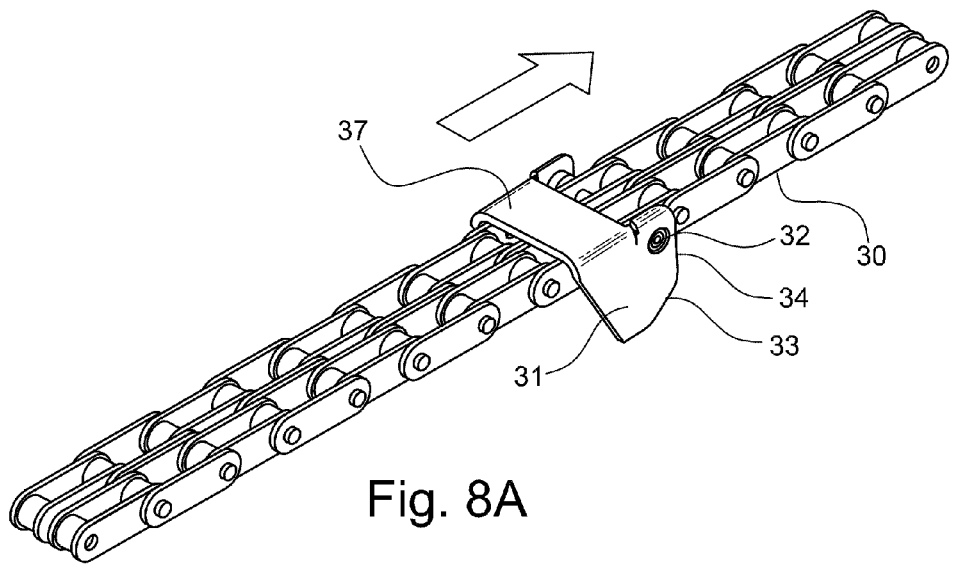
FIG. 8A is a top perspective view of a section of the chain conveyor with the pusher rotated down against the conveyor in the bypass position.
Figure 8B:
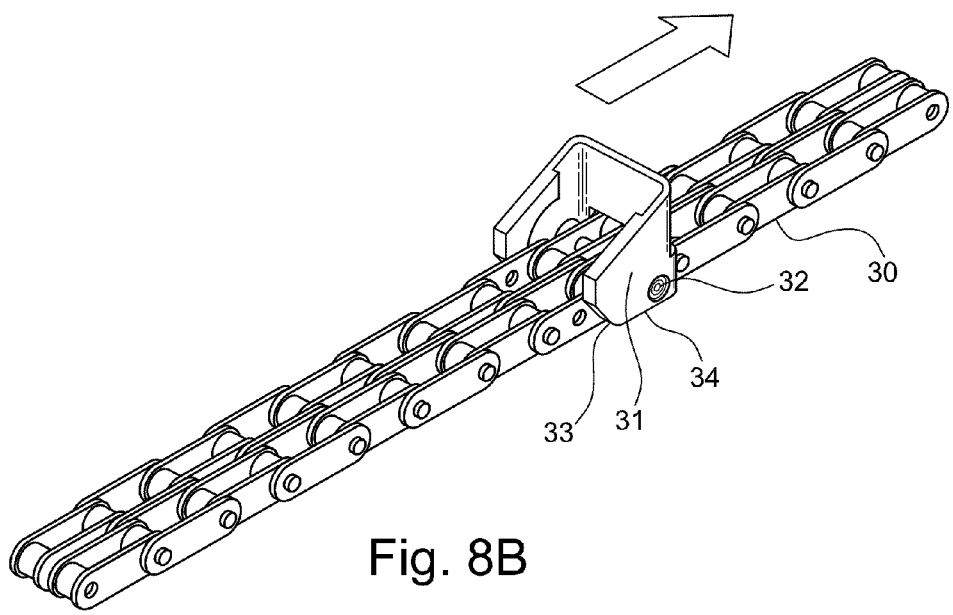
FIG. 8B is a top perspective view of a section of the chain conveyor of the present invention with the pusher rotated up into the push position.

FIG. 8A is a top perspective view of a section of conveyor 30. Pusher 31 is rotatably attached to conveyor 30 with pivot 32. Pusher 31 is rotated down against conveyor 30 in the bypass position. Edges 33 and 34 are seen reaching below the lower surface of conveyor 30. FIG. 8B is the same view with pusher 31 rotated up on conveyor 30 in the push position. In both figures, the arrow indicates the direction of travel of conveyor 30.

Figure 9:
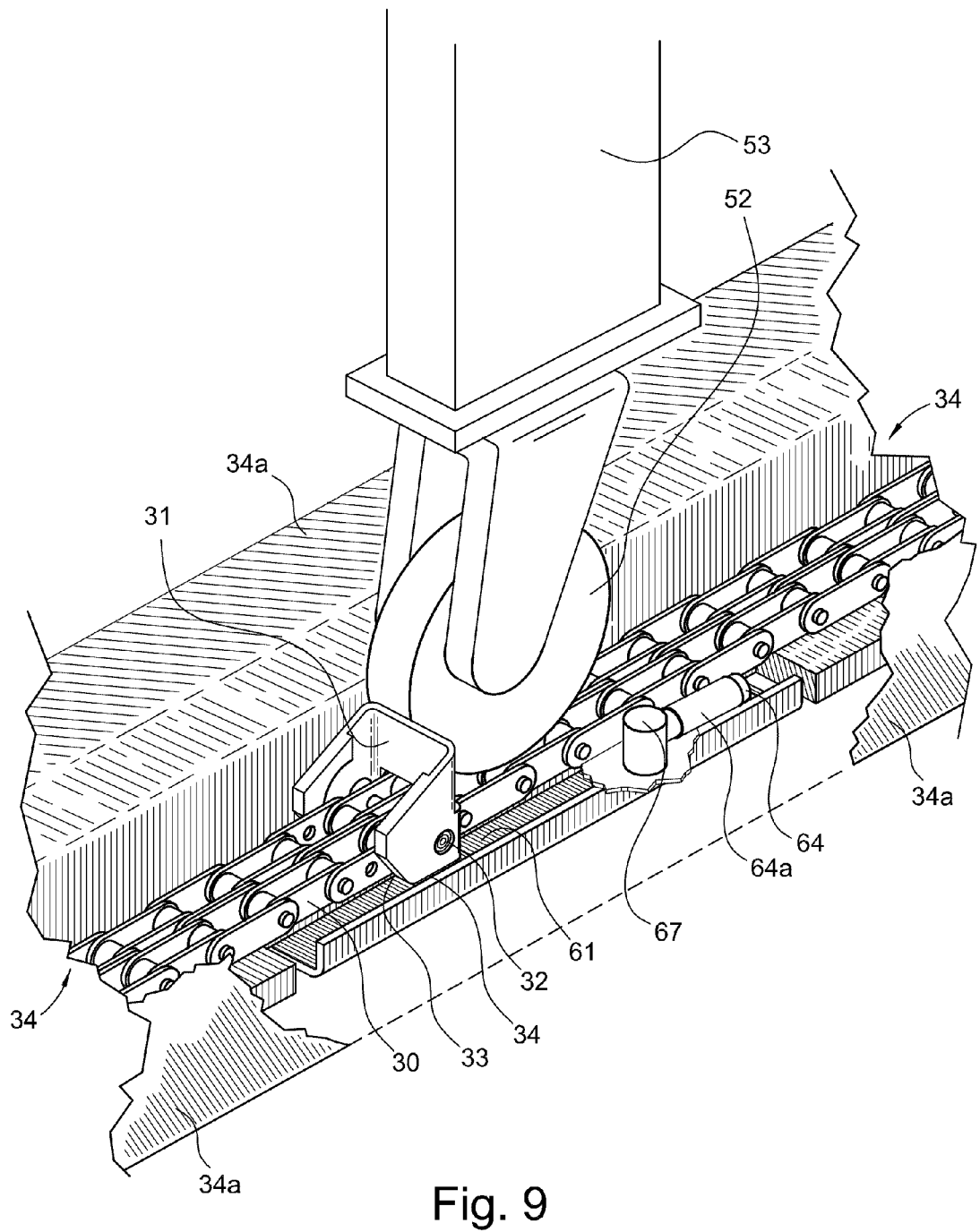
FIG. 9 is a top perspective view of the conveyor channel showing a wheel of the cart positioned between the channel sidewalls with the pusher contacting the wheel in the push mode.

FIG. 9 is a top perspective view of channel 34 with channel sidewall 34a cutaway showing wheel 52 between channel sidewalls 34a with system 10 in the push mode. Pusher 31 is seen pushing against wheel 52 in the direction of the arrow. Shelf 61 is visible in slot 36 and blocker 64 is retracted into sidewall 34a. As discussed above, with shelf 61 moved into or closer to slots 36, clearance for edges 33 and 34 is reduced and they contact shelf 61. As edges 33 and 34 are moved against shelf 61 by conveyor 30, the configuration of edges 33 and 34 causes pusher 31 to rotate into the push position. After moving into the push position, pusher 31 contacts wheel 52 and moves cart 50 in the direction of the arrow while edge 34 slides on raised shelf 61.

Figure 10:
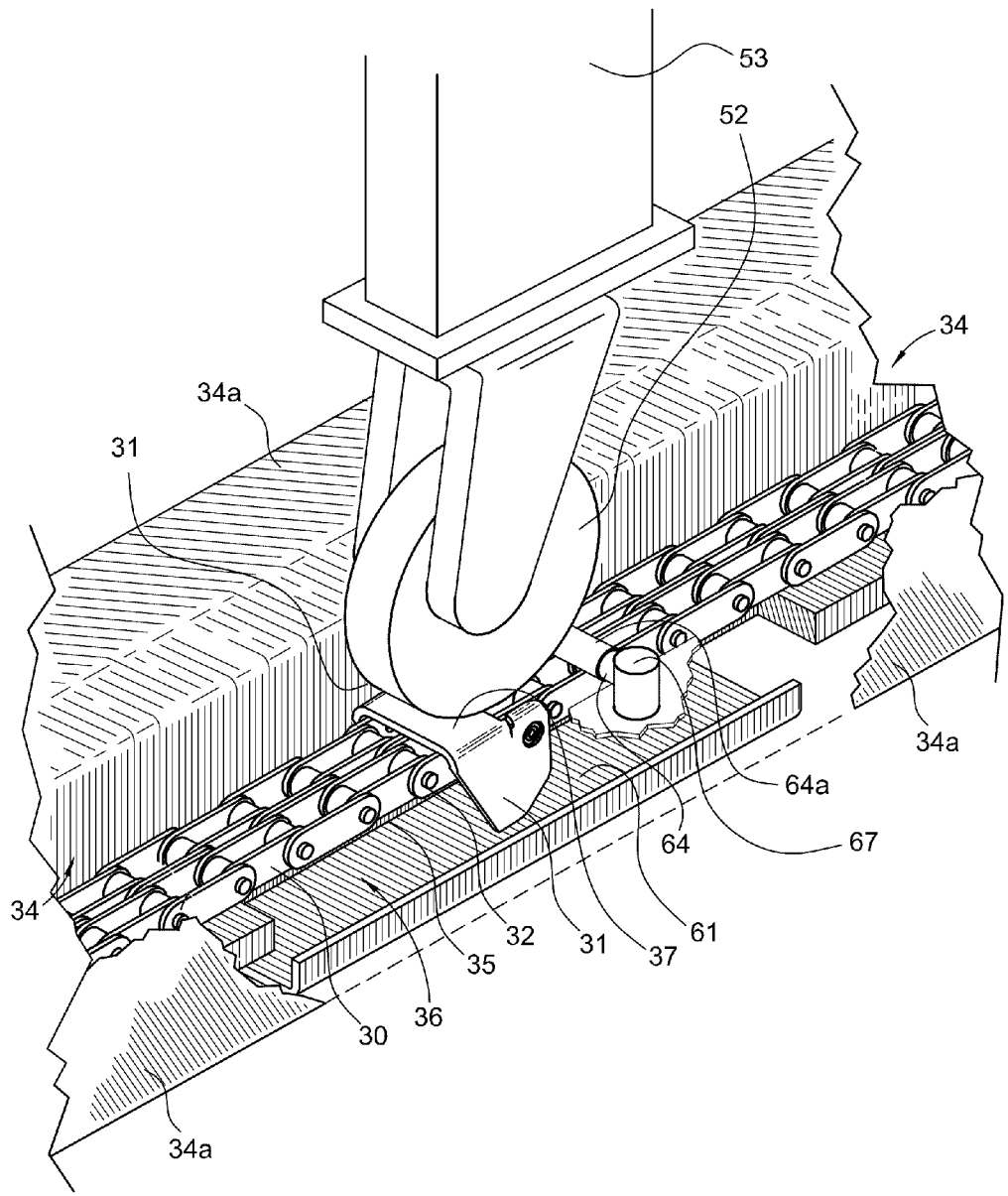
FIG. 10 is a top perspective view of channel with the system of the present invention in the bypass mode with the pusher rotated against the conveyor and the blocker extending across the channel.

FIG. 10 is a top perspective view of channel 34 with channel sidewall 34a cutaway with system 10 in the bypass mode. Shelf 61 is retracted from slots 36 thereby providing clearance for edges 33 and 34. Pusher 31 will then fall to chain 30 and pass under wheel 52. Preferably, pusher 31 is configured to rotate back against the direction conveyor 30. Blocker 64 is moved across channel 34 to prevent inadvertent movement of cart 50 along channel 34.

In operating system 10, microcontroller 40 acts to control the operating cycle of operator 20, in this case wash and/or dry cycle washer 20. In one preferred embodiment, the microcontroller 40 acts to synchronize the movement of carts 50 along channel 34 with the opening and closing of the doors 21 and 22 of washer 20 as well as with the operation of washer 20 itself. This allows carts 50 to be moved to, through, and from washer 20 while simultaneously moving more carts on the upstream side of washer 20 in channel 34 toward washer 20 to be washed. In one preferred embodiment, different loading zones are established along channel 34 each having at least one assembly 60 controlling both shelf(ves) 61 and blocker(s) 64 as described above. Microcontroller 40 controls shelf 61 and blocker 64 in each loading zone so they act together to achieve the bypass mode or push mode under the direction of microcontroller 40. In this preferred embodiment, sensors inform microcontroller 40 if a particular loading zone(s) is empty or contains cart(s) 50. If a zone is empty, meaning a cart 50 is not present in the zone, blocker 64 for an upstream loading zone that contains carts is retracted from across channel 31 and, simultaneously, shelf(ves) 61 for that upstream loading zone are extended into or closer to slots 36 on either side of center strip 35 to initiate the push mode. Thus, the push mode is initiated in the upstream loading zone and chain 30 moves and pusher 31 contacts shelves 61 and rotates up away from chain 30 and pushes one or more carts 50 past retracted blocker 64 to a downstream empty loading zone where shelves 61 are retracted and blocker 34 is extended across channel 31 as the bypass mode is initiated. By downstream is meant, in the direction toward operator 20 or, continuing in the same direction, away from the exit side of operator 20.

As mentioned above, microcontroller 40 is functionally attached to and controls the movement of shelves 61 and blocker 64. By functional attachment is meant that the link between microcontroller 40 and actuators 62 and 65, a well as appropriate sensors to detect the load status (empty, loading, or full) of each of the loading zones, allows for separate control over the components of each zone through either a direct link, such as a single cable, two or more cables joined together, and/or an indirect link such as a radio or wireless connection. The functional attachment of microcontroller 40 may be through electrically powered actuators or actuators powered using compressed air.

When pusher 31 reaches an empty zone while pushing cart 50, it falls to chain 30 as shelves 61 are moved away from slots 36 thereby providing clearance between chain 30 and shelf 61 to allow edges 33 and 34 to rotate away from cart 50 and extend below chain 30. Thus, the cart is no longer pushed by chain 30. Any movement of carts 50 along channel 31 caused by momentum is checked by blocker 34. It will be recognized that in this preferred mode, a plurality of carts may be loaded into channel 34 by moving loaded carts 50 to downstream zones. It will also be recognized that several carts 50 may be loaded in multiple loading zones over the duration of a single wash/dry cycle of washer 20 to wait to move by means of the microcontroller controlled method described above. In addition, microcontroller 40 may activate a bypass mode for one zone when it senses that an adjacent downstream zone holds carts. Thus, microcontroller 40 controls each of the zones independently and directs the movement of carts 50 into and out of zones as the downstream zones empty. Because pushers 31 can be moved into push and bypass positions, a single chain 30 can run continuously without stopping and starting while the loading zones cycle from push to bypass modes. Timing and control software is of the type that is readily available to or programmed by those having skill in the art. One embodiment is included in the instant application as depicted in FIGS. 11-60.

The invention provides an unexpected advantage over the systems in which several separate conveyors are used in an input channel for unsynchronized loading. No gaps are created between separate chains where cart wheels may lodge to prevent them from being successfully pushed by the chain. Less time is therefore needed to dislodge wheels from the gaps. A second advantage has been found in that there is less wear and tear on cart wheels using the present invention as chain gaps, pushers, and blockers are less likely to wear against the wheels when the cart is stopped. A third advantage has been achieved in that carts 50 or other devices carried by conveyor 30 may be loaded along the whole of the input or upstream side of conveyor 30 by a single worker after which system 10 may be left unattended while carts 50 are moved through the loading zones and into and out of operator 20 under control of microcontroller 40. Thus, constant monitoring by a worker to feed and remove carts is not needed, thereby providing both reduced personnel costs and more efficient operation.

Thus it is seen that the objects of the invention are efficiently obtained, although changes and modifications to the invention should be readily apparent to those having ordinary skill in the art, which changes would not depart from the spirit and scope of the invention as claimed.

We claim:

1. An operating system with a chain drive conveyor comprising:
    a microcontroller;
    an operator having an entrance;
    a carrier chain conveyor extending at least to said entrance of said operator and driven by at least one chain drive motor and a chain drive rotator;
    a plurality of pushers rotatably attached to said carrier chain conveyor;
    a channel having an upper side, said upper side containing said carrier chain conveyor;
    a plurality of extendable shelves under said upper side and distributed along the length of said channel; and,
    a plurality of shelf actuators, each of said plurality of shelf actuators operatively attached to one of said plurality of extendable shelves to move said one of said plurality of shelves into or away from a slot located on either side of said channel;
    wherein said microcontroller is functionally attached to at least said plurality of shelf actuators, each of said shelf actuators independently controlled by said microcontroller; and,
    a plurality of loading zones each of said plurality of loading zones having at least one shelf actuator.

2. The operating system as recited in claim 1 wherein said operator further comprises an exit and said carrier chain conveyor extends through said exit.

3. The operating system as recited in claim 1 wherein said channel further comprises a center strip within said upper side of said channel wherein said slots are located on each side of said center strip.

4. The operating system as recited in claim 1 further comprising at least one means for blocking, said at least one blocking means controlled by said microcontroller and retractably extended across said upper side of said channel wherein said blocking means acts with said shelf actuator.

5. The operating system as recited in claim 4 wherein said at least one blocking means is a bar operatively connected to an actuator.

6. The operating system as recited in claim 5 further comprising a shell loosely enclosing at least part of said bar.

7. The operating system as recited in claim 1 wherein said channel further comprises a lower side.

8. The operating system as recited in claim 1 wherein said operator is a washer/dryer.

9. The operating system as recited in claim 1 wherein said operator is a kiln.

10. The operating system as recited in claim 1 wherein said operator is a bulk sterilizer.

11. A washer cleaning system comprising:
    a microcontroller;
    a washer having an entrance;

a carrier chain conveyor system extending at least to said entrance of said washer between at least one chain drive motor and a chain drive rotator;

a plurality of pushers rotatably attached to said carrier chain conveyor;

a channel having an upper side, said upper side containing said carrier chain conveyor;

a plurality of extendable shelves under said upper side and distributed along the length of said channel, wherein each of said extendable shelves engages one of said pushers when extended; and, a plurality of shelf actuators, each of said plurality of shelf actuators operatively attached to one of said plurality of extendable shelves;

wherein said microcontroller is functionally attached to at least said plurality of shelf actuators, each of said shelf actuators independently controlled by said microcontroller; and, a plurality of loading zones each of said plurality of loading zones having at least one shelf actuator.

12. The washer system as recited in claim 11 wherein said washer further comprises an exit.

13. The washer system as recited in claim 11 wherein said channel further comprises a center strip within said upper side of said channel.

14. The washer system as recited in claim 11 further comprising at least one means for blocking, said at least one blocking means controlled by said microcontroller and retractably extended across said upper side of said channel.

15. The washer system as recited in claim 14 wherein said at least one blocking means is a bar operatively connected to at least one blocking means actuator each of said blocking means actuators independently controlled by said microcontroller.

16. The washer system as recited in claim 15 further comprising a shell enclosing at least part of said bar.

17. The washer system as recited in claim 11 wherein said channel further comprises a lower side.

18. The washer system as recited in claim 11 further comprising a dryer component.

* * * * *